United States Patent

Judd et al.

[15] 3,675,158
[45] July 4, 1972

[54] SELF-OSCILLATING SWITCHING REGULATOR WITH SECONDARY SWITCHING CONTROL SIGNAL TO REGULATE SWITCHING FREQUENCY

[72] Inventors: Frank Fuller Judd, Madison; Helmut Wilhart, Whippany, both of N.J.

[73] Assignee: Bell Telephone Laboratories, Incorporated, Murray Hill, Berkeley Heights, N.J.

[22] Filed: Dec. 21, 1970

[21] Appl. No.: 100,147

[52] U.S. Cl. .................................331/109, 307/297, 321/19, 323/22 T, 331/111, 331/175, 331/183
[51] Int. Cl. ........................................G05f 1/40, H03b 3/04
[58] Field of Search .........................331/109, 111, 175, 183; 321/16, 18, 19; 323/18, 20, 22 SC, 22 T; 307/97, 129, 130, 132 R, 297; 328/267

[56] References Cited

UNITED STATES PATENTS 3,366,872  1/1968  Lemoine ..................................323/22
3,403,321  9/1968  Mosak ....................................323/20
3,577,059  5/1971  Kelley, Jr. ..............................321/18 X Primary Examiner—Roy Lake
Assistant Examiner—Siegfried H. Grimm
Attorney—R. J. Guenther and E. W. Adams, Jr.

[57] ABSTRACT

A self-oscillating switching regulator is frequency regulated by the introduction of secondary switching control signals into the voltage regulation feedback loop to delay switching of the switching device. The secondary switching control signal is generated by a monostable circuit with a frequency responsive time constant. The secondary switching control signal comprises a variable duration pulse signal. This pulse signal is tacked onto the trailing edge of the conventional switching control signal and hence extends the duration of the control signal applied to the switching device. The switching delay introduced by the secondary control signal directly regulates the switching frequency of the switching regulator.

6 Claims, 3 Drawing Figures

Patented July 4, 1972    3,675,158

INVENTORS F. F. JUDD
H. WILHART
BY Alfred G. Steinmetz
ATTORNEY

SELF-OSCILLATING SWITCHING REGULATOR WITH SECONDARY SWITCHING CONTROL SIGNAL TO REGULATE SWITCHING FREQUENCY

BACKGROUND OF THE INVENTION

This invention relates to switching mode voltage regulators. It is specifically concerned with the self-oscillating type switching regulator and relates more particularly to the regulation of the frequency of operation of the switching regulator.

Switching mode regulators operate by transmitting pulses of energy from a source of continuous energy to an output terminal via a switching device. The voltage level appearing at the output terminal is regulated by comparing it to a reference signal. An error signal is generated in response to this comparison and utilized to control the switching device transmitting the pulses of energy.

Switching mode regulators may be driven or self-oscillating. The driven regulator transmits the pulses of energy at a fixed frequency. This fixed frequency is controlled by a discrete frequency The rate at which capacitor 381 charges determines the duration of the pulse outputof the monostable circuit 318. As indicated above, when regulator is stable with respect to frequency, but its response to changes in the output voltage level may be delayed since there may be a loss of regulation control during a portion of each switching cycle. 320, The self-oscillating switching mode regulator inherently counteracts excursions of the output voltage beyond specified levels. A typical self-oscillating switching mode voltage regulator shown in FIG. 1 has a series switching transistor 110 and an inductor 107 inserted between an input terminal 101, to which power is applied, and an output terminal 104, to which a load is connected. The series switching transistor 110 is controlled so that it transmits energy whenever the voltage at terminal 104 drops below a specified level. The transmission of energy through transistor 110 is inhibited when the voltage at the output terminal 104 rises above another specified level.

The control circuitry utilized to control the switching of the switching transistor 110 includes a potentiometer 117 coupled across the output terminals 104 and 105. A voltage proportional to the voltage across the output terminals 104 and 105 is transmitted from the wiper arm of the potentiometer 117 to a voltage error detector circuit 116. The voltage error detector circuit 116 comprises a source of reference voltage and a comparison circuit which generates a signal proportional to the difference between the reference voltage and the voltage at the wiper arm of the potentiometer 117. The signal output of the voltage error detector 116 is applied to a hysteretic bistable trigger 115 which changes its output state whenever the error signal crosses one of its two input threshold levels. The output signal of the hysteretic bistable trigger 115 is applied to an amplifier 114 and from thence to the base 111 of the switching transistor 110. In this manner the error signal determines the conductive state of the switching transistor 110.

In operation the output voltage of the regulator increases until the error voltage output of detector 116 reaches that input threshold level of the hysteretic bistable trigger 115 which causes an appropriate change in the trigger output state to cause amplifier 114 to bias the switching transistor 110 nonconducting.

During the nonconducting period of transistor 110 the load current is supplied, via the flyback diode 106, the inductor 107 and discharging capacitor 109, to the output load. As the current in inductor 107 decays and capacitor 109 discharges, the voltage across the output terminals 104 and 105 begins to decrease. As the output voltage decreases, the error signal output of the voltage error detector 116 reverses its prior direction of change and when it passes through the other threshold level of the hysteretic bistable trigger 115 the corresponding change of the trigger output state causes amplifier 114 to bias the switching transistor 110 into conduction again.

While this regulator circuit arrangement is fairly simple and reliable, its frequency of operation may be unstable. For example, the switching frequency responds to changes in the input source voltage coupled to terminals 101 and 102 and to changes in the output load impedance coupled to output terminals 104 and 105. In addition, the frequency of operation is responsive to entrainment of the switching frequency to some outside frequency source or by periodic signals which may be reflected from the output load connected to terminals 104 and 105.

It is therefore an object of the present invention to operate a self-oscillating type switching mode regulator at a constant frequency.

It is another object of the invention to compensate for frequency variation in the switching of a self-oscillating switching mode regulator by insertion of secondary switching signals of controlled duration into the voltage feedback loop.

SUMMARY OF THE INVENTION

In accord with the above objects, the frequency of switching of a self-oscillating switching mode regulator is regulated by injecting pulse signals of controlled duration into the voltage feedback loop at the point where the switch drive signal is generated. These pulse signals act as secondary switching control signals which extend the duration of the switch drive signal. This pulse signal is generated by a monostable pulse circuit with a controllable time constant which is responsive to a frequency error voltage derived from a frequency-to-voltage converter included in the regulator. Logic circuitry is utilized to inject this pulse signal into the voltage feedback loop so that it is contiguous with the trailing edge of the regular switch drive signal.

BRIEF DESCRIPTION OF THE DRAWINGS

The invention may be readily understood by reference to the following detailed description and the accompanying drawings wherein.

DETAILED DESCRIPTION

Figure 2:
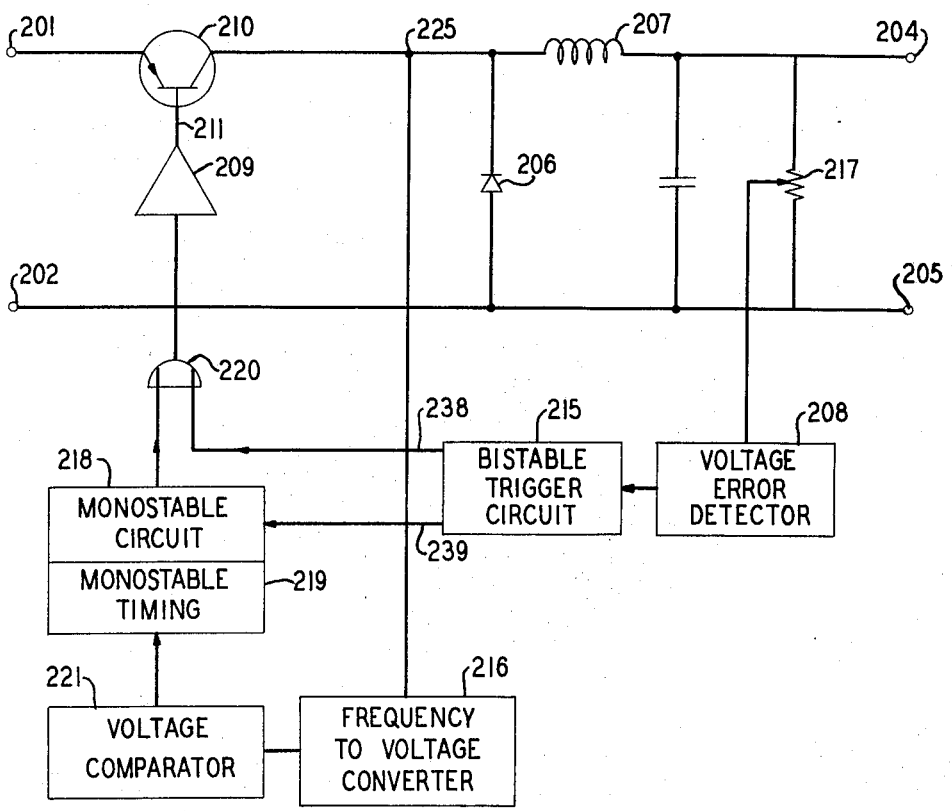
FIG. 2 is a diagram of a self-oscillating switching mode regulator with a frequency regulation feedback loop according to the principles of the invention.

A voltage regulator embodying the principles of the invention is disclosed in partially schematic and partially block diagram form in FIG. 2. This switching regulator is designed to control its switching frequency by introducing a variable duration secondary control signal into the voltage regulation feedback path which is contiguous to and follows the trailing edge of the normal switch drive signal. This variable duration of the secondary control signal is responsive to the switching frequency of the regulator and is phased to counteract drifts in frequency from a desired regulated frequency.

Figure 1:
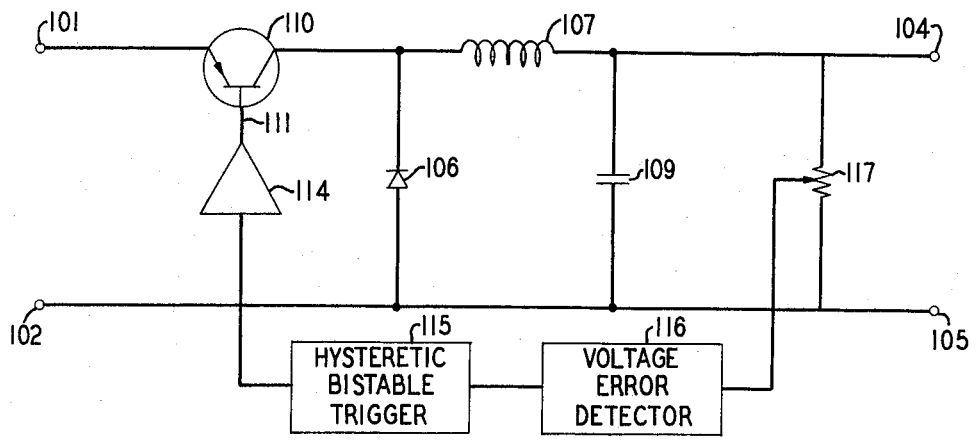
FIG. 1 is a diagram of a self-oscillating switching mode regulator in accord with the prior art and which is described hereinabove.

An unregulated source of voltage is coupled to input terminals 201 and 202. This voltage is recurrently coupled, via the switching transistor 210, to the output terminals 204 and 205. An output load may be connected to the output terminals 204 and 205. The output voltage is monitored by the voltage error detector 208 which is connected to a potentiometer 217 shunting the output terminals 204 and 205. The voltage error detector 208 compares the voltage at the wiper arm of the potentiometer 217 with an internally generated reference voltage. In this manner an error signal is developed which is applied to the input of a hysteretic bistable trigger circuit 215. The bistable trigger circuit 215 has two output leads 238 and 239 at which appear oppositely phased signals having complementary logic designations. The normal switch drive signal is applied, via output lead 238, to the OR gate 220. The OR gate 220 is coupled, via an amplifier 209, to the base 211 of the switching transistor 210. Since the operation of the voltage feedback loop is substantially identical to that of the regulator disclosed in FIG. 1, it is not described herein in detail.

The oppositely phased signal output of the bistable trigger circuit 215 on lead 239 is applied to a monostable circuit 218. The monostable circuit 218 generates a pulse output which is applied to the OR gate 220. When the output signal on lead 238 changes state to a voltage level which turns off the switching transistor 210, the complementary output signal on lead 239 triggers the monostable circuit 218. The pulse signal or secondary control signal generated by the monostable circuit 218 is applied, via OR gate 220, to the base 211 of the switching transistor 210. This pulse signal maintains the transistor 210 in its saturation condition and hence delays the turn off of the switching transistor 210. The duration of the pulse signal to delay turn off of transistor 210 determines the switching frequency of the regulator. The duration of this delay is controlled by the monostable timing adjustment circuit 219 as described below.

The switching frequency of the transistor 210 is monitored by a frequency-to-voltage converter 216 which is coupled to node 225 in the main conduction path of the regulator. The frequency-to-voltage converter 216 generates a voltage proportional to the switching frequency of the regulator. The voltage comparator 221 compares this voltage to an internally generated reference voltage and generates a frequency error voltage therefrom. This frequency error voltage is applied to the monostable timing adjustment circuit 219. The timing adjustment circuit 219, in response to this signal, controls the duration of the pulse output of the monostable circuit 218.

This variable duration pulse signal which is tacked onto the trailing edge of the normal switch drive signal determines the switching frequency of the switching regulator. If the regulator deviates from its normal switching frequency, the duration of the pulse output of the monostable circuit 218 is adjusted to return the regulator to its regulated frequency. If, for example, the switching frequency of the regulator should increase due to variations in the load or in the input voltage, the frequency error voltage output of the voltage comparator 221 will change magnitude. This changed magnitude will adjust the monostable timing adjustment circuit 219 to increase the duration of the pulse output of the monostable circuit 218. This will increase the total conduction period of the switching transistor 210 per switching cycle without changing its duty cycle which is controlled by the voltage error detector 208 and hence will reduce the switching frequency of the regulator to its regulated value.

Figure 3:
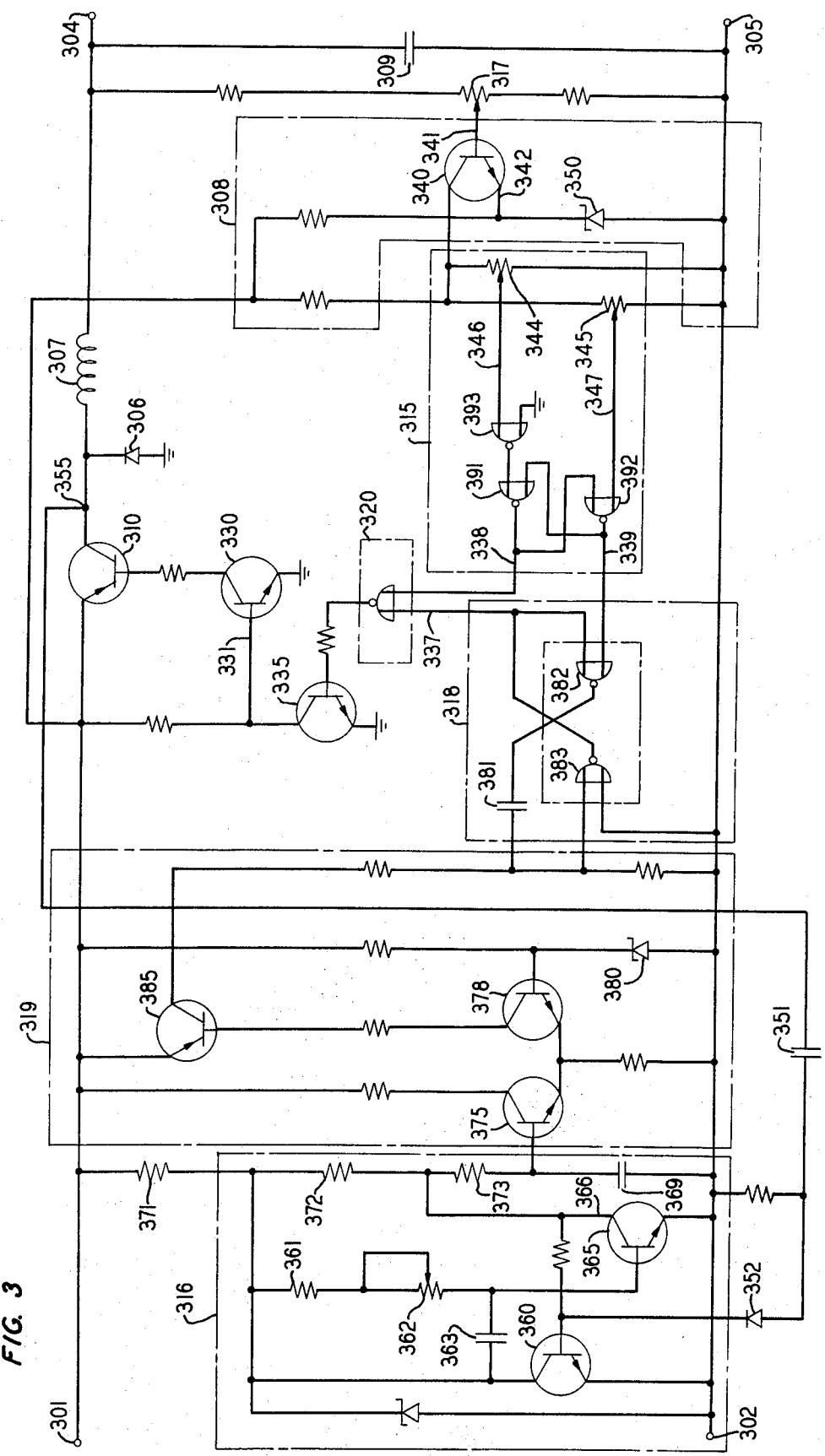
FIG. 3 is a schematic diagram of a self-oscillating switching mode regulator with a frequency regulation feedback loop according to the principles of the invention.

A detailed schematic drawing of a switching mode regulator embodying the principles of the invention is disclosed in FIG. 3. This regulator is similar to the switching regulator disclosed in block diagram form in FIG. 2 and described hereinabove. A positive unregulated input voltage is applied to the input terminals 301 and 302. This voltage is recurrently transmitted by the switching transistor 310 to the output terminals 304 and 305.

An understanding of the invention may be readily acquired by describing a typical cycle of operation of the regulator. For the purposes of explanation, assume that the switching transistor 310 has just initiated its conduction cycle. As the transistor 310 is driven into saturation, it transmits increased current which causes the output voltage across the load to increase. The biasing drive for the transistor 310 is supplied by the transistor 330 which is in a saturated conducting state at this time. The conductivity of the transistor 330 is in turn controlled by the collector voltage of transistor 335 which is currently biased nonconducting. The conductive state of transistor 335 is controlled by the output of NOR gate 320. During this portion of the switching cycle, the voltage output of the NOR gate 320, in response to the high voltage output of the bistable trigger circuit 315 on lead 338, is in a low voltage state.

The output voltage occurring across output terminals 304 and 305 is monitored by the voltage error detector 308. The voltage error detector 308 is coupled to the potentiometer 317 which is shunted across the output terminals 304 and 305. The voltage error detector 308 includes a transistor 340 whose base electrode 341 is coupled to the potentiometer 317. The emitter electrode 342 of transistor 340 is at a reference voltage established by the breakdown diode 350. As the output voltage increases in magnitude, an increasing voltage is applied to the base 341 of transistor 340. As the output voltage increases, the conductivity of transistor 340 increases, causing a decrease in its collector voltage.

Defined fractional values of the collector voltage of transistor 340 are applied, via the parallel connected potentiometers 344 and 345, to the leads 346 and 347, respectively, included in the bistable trigger circuit 315. The leads 346 and 347 are coupled to the two cross-coupled NOR gates 391 and 392. A third NOR gate 393, connected to lead 346, inverts the input to NOR gate 391. The bistable trigger circuit 315 has a hysteretic trigger characteristic as long collector the fractional amount of the collector voltage applied to lead 346 exceeds the fractional amount of the collector voltage applied to lead 347. The hysteresis width of the bistable trigger circuit 315 is determined by the magnitude of the difference between the fractions of this collector voltage applied to leads 346 and 347. The details of the operation of this trigger circuit may be readily ascertained by means of a logical type circuit analysis by those skilled in the art and it is not believed to be necessary to describe its switching operation in detail.

As the collector voltage of transistor 340 decreases, the voltage on lead 347 first drops below the threshold necessary to operate NOR gate 392. Because of the cross-coupling of the NOR gates 391 and 392, the trigger circuit output on lead 338 does not change in response to the crossing of the NOR gate threshold by the input signal on lead 347. When the threshold of NOR gate 393 is crossed by the decreasing voltage applied to lead 346, however, the output on lead 338 of the bistable trigger circuit 315 changes state. When the bistable trigger circuit 315 changes state, the output voltage on lead 338 assumes a low voltage state. The complementary output voltage on lead 339 assumes a high voltage state.

The high voltage output on lead 339 triggers the monostable circuit 318. The monostable circuit 318 comprises two cross-coupled NOR gates 382 and 383. When the monostable circuit 318 is triggered, it generates a controlled delay pulse on lead 337 which is contiguous to the trailing edge of the previous high voltage output pulse on lead 338. This controlled delay pulse is applied to the NOR gate 320 and maintains the output of NOR gate 320 in a low voltage state. The duration of this controlled delay pulse is responsive to the frequency regulation circuitry which is described hereinbelow. This controlled delay pulse is the secondary control signal which regulates the switching frequency of the regulator.

When the monostable circuit changes back to its quiescent state, the output of NOR gate 320 assumes its high voltage output state. This high voltage applied to the base of transistor 335 switches the transistor 335 into a saturated conduction state. With transistor 335 saturated, the base 331 of transistor 330 is at ground potential and hence the transistor 330 is biased into a nonconductive state. This removes the base drive from transistor 310 and turns it off. The output current is now supplied, via the flyback diode 306, inductor 307 and the discharging capacitor 309. As this inductor current eventually decays and capacitor 309 discharges, the output voltage across terminals 304 and 305 drops.

This drop in output voltage reduces the level of the bias signal applied to the transistor 340 and hence lowers its conductivity. The collector voltage of transistor 340 increases. This increased voltage is applied, via potentiometer 345, to the lead 347 and via potentiometer 344 to the lead 346, of the bistable trigger circuit 315. As the collector voltage of transistor 340 increases, the voltage on lead 346 first reaches the threshold level of gate 393. This prepares the bistable trigger circuit 315 for a change of its output state which eventually occurs when the voltage on lead 347 reaches the threshold level of gate 392. This change in state produces a high voltage level output on lead 338. This high voltage level is applied to NOR gate 320, causing it to assume a low voltage output which biases the transistor 335 into its nonconducting state. The collector voltage of transistor 335 biases transistor 330 into its saturated conducting state, which in turn biases switching transistor 310 into a saturated conducting state. As the output voltage across output terminals 304 and 305 increases again, the above described voltage regulation cycle is repeated.

The switching frequency of the transistor 310 is monitored by a frequency-to-voltage converter 316, which is coupled to the main conduction path of the regulator at node 355. When transistor 310 switches into conduction, the pulse wave front appearing at node 355 is applied to the base of transistor 360, via the differentiating capacitor 351 and diode 352. Transistor 360, in response thereto, turns on and a negative pulse signal is applied, via capacitor 363, to the base of transistor 365, biasing the normally conducting transistor 365 into a nonconducting state. This results in a positive voltage pulse at the collector 366 of transistor 365. The width of the pulse is determined by capacitor 363, resistor 361, and variable resistor 362. An integrating network consisting of resistor 373 and capacitor 369 is connected to the collector 366 of transistor 365 and causes an average voltage which is proportional to the pulse width and pulse repetition rate to appear across capacitor 369. Since the pulse repetition rate is equal to the switching frequency of the regulator, it is apparent that the average voltage across capacitor 369 is directly proportional to the switching frequency. Furthermore, since the pulse width is adjustable by means of the variable resistor 362, the proportionality factor between the voltage across capacitor 369 and the switching frequency can be varied. Thus variable resistor 362 affords a means for adjusting the switching frequency of the regulator, as will be apparent from the further description of the frequency regulation loop hereinbelow.

The voltage across the capacitor 369 controls the conductivity of transistor 375 included in the timing adjustment circuit 319. The two transistors 375 and 378 are connected in a differential amplifier configuration which performs a comparator function. The differential amplifier in conjunction with transistor 385 and breakdown diode 380 comprises the timing adjustment circuit 319. As the voltage across the capacitor 369 increases in magnitude, the conductivity of transistor 375 increases to an extent determined by emitter-coupled transistor 378, which has its base electrode connected to the reference voltage across the breakdown diode 380. In this manner a comparator function is performed upon the voltage across capacitor 369. The conductivity of transistor 378 decreases as the conductivity of transistor 375 increases. The conductivity of transistor 378 in turn controls the conductivity of transistor 385.

The collector-emitter path of transistor 385 connects the input voltage at terminal 301 to a timing capacitor 381 included in one of the cross-coupled paths of the monostable circuit 318. The rate at which capacitor 381 charges determines the duration of the pulse output of the monostable circuit 318. As indicated above, when the bistable trigger circuit 315 changes state to turn the switching transistor off, its complementary output triggers the monostable circuit 318. The monostable circuit 318 applies a delay pulse with a controlled duration to NOR gate 320, via lead 337, in order to delay the turn-off of switching transistor 310.

When the bistable trigger circuit 315 changes state at the end of the normal switch drive signal, its signal output on lead 339 assumes a high voltage level. This high voltage applied to the input of NOR gate 382 causes its output to assume a low voltage state. The low voltage output of NOR gate 382 is cross-coupled, via capacitor 381, to the input of NOR gate 383. The NOR gate 383, in response thereto, assumes a high voltage output which is applied, via lead 337, to the NOR gate 320. The NOR gate 320, in response thereto, maintains its low voltage output state which keeps the transistor 335 in a nonconducting condition.

The capacitor 381 is in the meantime being charged positively by the input voltage, via the collector-emitter path of transistor 385. The conductivity of transistor 385, which depends on the conductivity of transistor 378, determines the rate at which the capacitor 381 is charged. It is readily apparent therefore that the rate at which capacitor 381 charges is directly responsive to the deviation of the switching frequency of the regulator from its regulated value. The regulated frequency of the regulator is established by the magnitude of the voltage generated by frequency-to-voltage converter 316 across capacitor 369 in comparison to the reference voltage across the breakdown diode 380.

When capacitor 381 is charged to a certain voltage level, the monostable circuit 318 changes state and the output of NOR gate 383 assumes a low voltage level. Since both inputs of the NOR gate 320 are now at a low voltage level, the output of NOR gate 320 assumes a high voltage level which biases transistor 335 into a conducting condition which turns off the switching transistor 310.

The pulse output of monostable circuit 318, with the controlled duration which serves as the secondary control signal, delays the turn-off of the switching transistor 310 during each cycle of operation of the regulator. By controllably varying the duration of the pulse output in response to the frequency deviation of the switching frequency of the regulator from some desired value, the switching frequency is corrected to the desired value. This technique is equivalent in effect to techniques which regulate the switching frequency by controlling the system hysteresis width of the regulator. This particular secondary control signal technique inserts a recurrent variable delay interval into the normal feedback control process. A direct advantage of this technique is that it creates a direct compensation signal to counteract storage time variations in the switching transistor 310 due to changes in the load current.

What is claimed is:

1. A self-oscillating switching regulator to derive a regulated voltage from an unregulated voltage source comprising
    an input and an output,
    a switching device coupling said input and output,
    a voltage regulation feedback loop to control said switching device,
    a bistable trigger circuit with complementary dual outputs included in said feedback loop, one of said complementary outputs being coupled to said switching device,
    a monostable circuit with its trigger input connected to the other one of said complementary outputs, and its output coupled to said switching device,
    a frequency-to-voltage converter responsive to the switching frequency of said switching device, and
    means to control the duration of the signal output of said monostable circuit in response to said frequency-to-voltage converter.

2. A self-oscillating switching regulator as defined in claim 1 wherein
    said monostable circuit includes an energy storage device to control timing of the pulse output, and
    said means to control the duration comprises a controllable impedance responsive to said frequency-to-voltage converter and coupling said voltage source to said energy storage device.

3. A self-oscillating switching regulator as defined in claim 2 wherein
    said controllable impedance comprises a transistor and further includes a differential amplifier having one input responsive to said frequency-to-voltage converter and its output connected to the control electrode of said transistor.

4. A self-oscillating switching regulator as defined in claim 3 further including a NOR gate to couple the output of said monostable circuit and the one complementary output of said bistable trigger circuit to said switching device.

5. A self-oscillating switching regulator comprising
input and output terminals,
a switching device coupling said input and output terminals and including a control electrode to control switching,
a feedback loop coupling said output terminal to said electrode including means to generate a switching signal to control the switching of said switching device in order to regulate the voltage at said output terminal,
means to inject a variable delay pulse into said feedback loop to delay the switching of said switching device and including
a frequency-to-voltage converter responsive to said switching device,
a pulse generator to generate a pulse whose duration is responsive to the voltage output of said converter, and
gating means responsive to said feedback loop to apply said pulse to said electrode at the trailing edge of said switching signal.

6. A self-oscillating switching regulator as defined in claim 5 wherein said pulse generator comprises
a monostable circuit including two cross-coupled gate devices and an energy storage device coupling the output of one of said cross-coupled gate devices to the input of the other cross-coupled gate device, and
said switching regulator further including means to control the rate of the storage of energy in said energy storage device responsive to said frequency-to-voltage converter.

* * * * *

UNITED STATES PATENT OFFICE
CERTIFICATE OF CORRECTION

Patent No. 3,675,158             Dated July 4, 1972

Inventor(s) Frank F. Judd and Helmut Wilhart

It is certified that error appears in the above-identified patent and that said Letters Patent are hereby corrected as shown below:

Col. 1, line 21, after "frequency" delete "The rate at which capacitor 381 charges determines the duration of the pulse output of the monostable circuit 318. As indicated above, when" and insert --source. The driven switching--;

line 26, after "cycle" delete --.320,".

Col. 4, line 18, after "long" delete "collector" and insert --as--.

Signed and sealed this 2nd day of January 1973.

(SEAL)
Attest:

EDWARD M. FLETCHER, JR.            ROBERT GOTTSCHALK
Attesting Officer                    Commissioner of Patents